US012718718B2

(12) United States Patent
Williams

(10) Patent No.: US 12,718,718 B2

(45) Date of Patent: Aug. 25, 2026

(54) HANDS-FREE SIGN HOLDER

(71) Applicant: Terile Williams, Tucson, AZ (US)

(72) Inventor: Terile Williams, Tucson, AZ (US)

( * ) Notice: Subject to any disclaimer, the term of this patent is extended or adjusted under 35 U.S.C. 154(b) by 85 days.

(21) Appl. No.: 18/414,071

(22) Filed: Jan. 16, 2024

(65) Prior Publication Data

US 2025/0232696 A1 Jul. 17, 2025

(51) Int. Cl.
*G09F 21/02* (2006.01)
*G09F 7/20* (2006.01)

(52) U.S. Cl.
CPC .............. *G09F 21/026* (2013.01); *G09F 7/20* (2013.01)

(58) Field of Classification Search
CPC ........... G09F 21/026; G09F 7/20; G09F 21/02
See application file for complete search history.

(56) References Cited

U.S. PATENT DOCUMENTS 518,780 A * 4/1894 Fogg ........................ G09F 21/02 40/586
6,843,012 B1 * 1/2005 Dodd ...................... G09F 21/02 40/586
7,133,002 B2 * 11/2006 Langlois ................. G09F 21/02 40/586
8,941,777 B1 * 1/2015 Ratner ................. G03B 17/563 396/420
9,727,896 B2 * 8/2017 Richardson .......... G09G 3/3208
11,808,405 B2 * 11/2023 Cook ..................... F16M 13/04
2007/0199219 A1 * 8/2007 Saliege ................... G09F 21/02 40/586
2007/0216600 A1 * 9/2007 Langlois ................. G09F 21/02 345/8
2007/0294855 A1 * 12/2007 Iida ....................... A47L 9/0081 15/327.5
2009/0051561 A1 * 2/2009 Cadavid ........... H04N 21/43637 725/32
2013/0033803 A1 * 2/2013 Evans .................... F16M 11/10 361/679.01
2014/0373408 A1 * 12/2014 Lee ......................... G09F 19/02 40/538
2019/0092087 A1 * 3/2019 Schorr, III ................ B43L 1/00

* cited by examiner

*Primary Examiner* — Gary C Hoge
(74) *Attorney, Agent, or Firm* — Eugene Vamos

(57) ABSTRACT

This device relates to a sign holder that allows for a user to carry a sign in a handsfree manner. The Hands-Free Sign Holder allows a sign to be easily and quickly fastened. The Hands-Free Sign Holder comprises two shoulder supported members, a back structure, one or more upright rods, one or more sign fasteners per upright rod. The Hands-Free Sign Holder may further comprise one or more connector assemblies per upright rod. The Hands-Free Sign Holder allows a user to carry a sign that can be seen above a crowd or over large distances. The Hands-Free Sign Holder can also be used for advertisement, safety warning, picketing, protesting, and tour guide group signaling. Sign types that would be suitable include paperboard, cardboard (corrugated), plastic, cloth, and any other material on which an image or text can be applied.

8 Claims, 10 Drawing Sheets

HANDS-FREE SIGN HOLDER

(B) CROSS-REFERENCE TO RELATED APPLICATIONS

Not Applicable

(C) STATEMENT REGARDING FEDERALLY SPONSORED R & D

Not Applicable

(D) THE NAMES OF THE PARTIES TO A JOINT RESEARCH AGREEMENT

Not Applicable

(E) REFERENCE TO A "SEQUENCE LISTING," A TABLE, OR A COMPUTER PROGRAM

Not Applicable

(F) STATEMENT REGARDING PRIOR DISCLOSURES BY AN INVENTOR OR JOINT INVENTOR

Not Applicable

(G) BRIEF DESCRIPTION OF THE SEVERAL VIEWS OF THE DRAWING

(H) BACKGROUND OF INVENTION

Since the beginning of civilization, images and text over surfaces—signs—have been used to communicate, in every form of human interaction: commerce, political speech, personal relationships, sports affiliation, etc.

When an individual wants to convey information over a space, a simple and effective way to accomplish this so is hold up a sign with your hands. However, this solution is limited both in time and space, as holding up a sign is tiring and limits mobility. This is especially true when the activity is lengthy in duration and distance: for example, the George Floyd protests and marches.

There is a need for a Hands-Free Sign Holder (100) that can be carried by a user (90) over a long distance and that allows for easy and quick sign fastening.

(I) DEFINITIONS

"rod"—a relatively long, evenly shaped piece of material, used for some mechanical purpose.

(J) DESCRIPTION OF THE INVENTION

Figure 2:
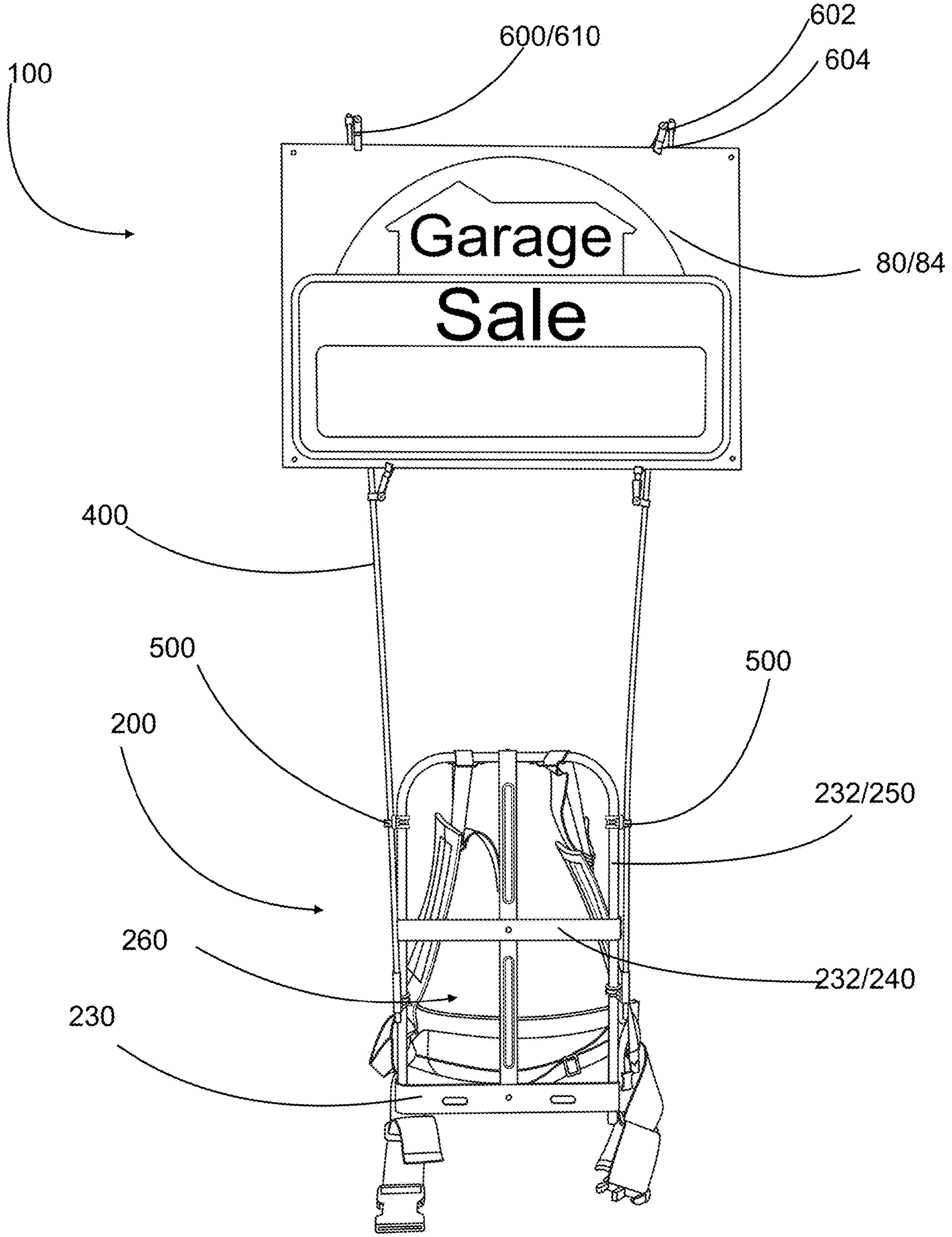
FIG. 2 shows a back view of the Hands-Free Sign Holder (100)

This device relates to a sign holder (100) that allows for a user (90) to carry a sign (80) in a hands-free manner. The Hands-Free Sign Holder ("sign holder") (100) allows a sign (80) to be easily and quickly fastened onto the sign holder (100). FIG. 2 is a back view of the Hands-Free Sign Holder (100) with a sign (80) fastened to the Hands-Free Sign Holder (100).

Figure 1:
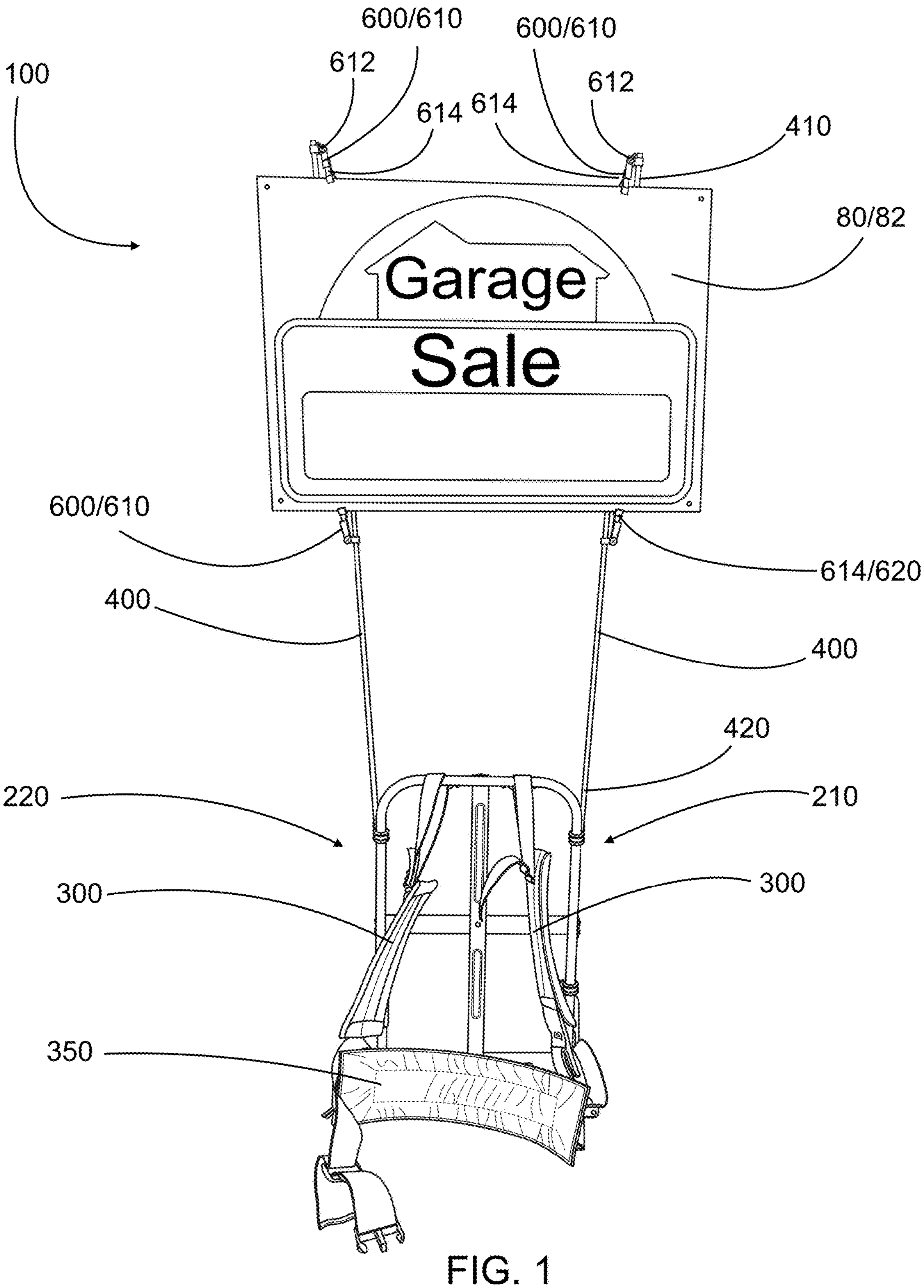
FIG. 1 shows a front view of the Hands-Free Sign Holder (100)

The sign holder (100) comprises two shoulder supported members (300), a back structure (200), one or more upright rods (400), one or more sign fasteners (600) per upright rod (400). The sign holder (100) may further comprise one or more connector assemblies (500) per upright rod (400). FIG. 1 is a front view of the sign holder (100).

Figure 3:
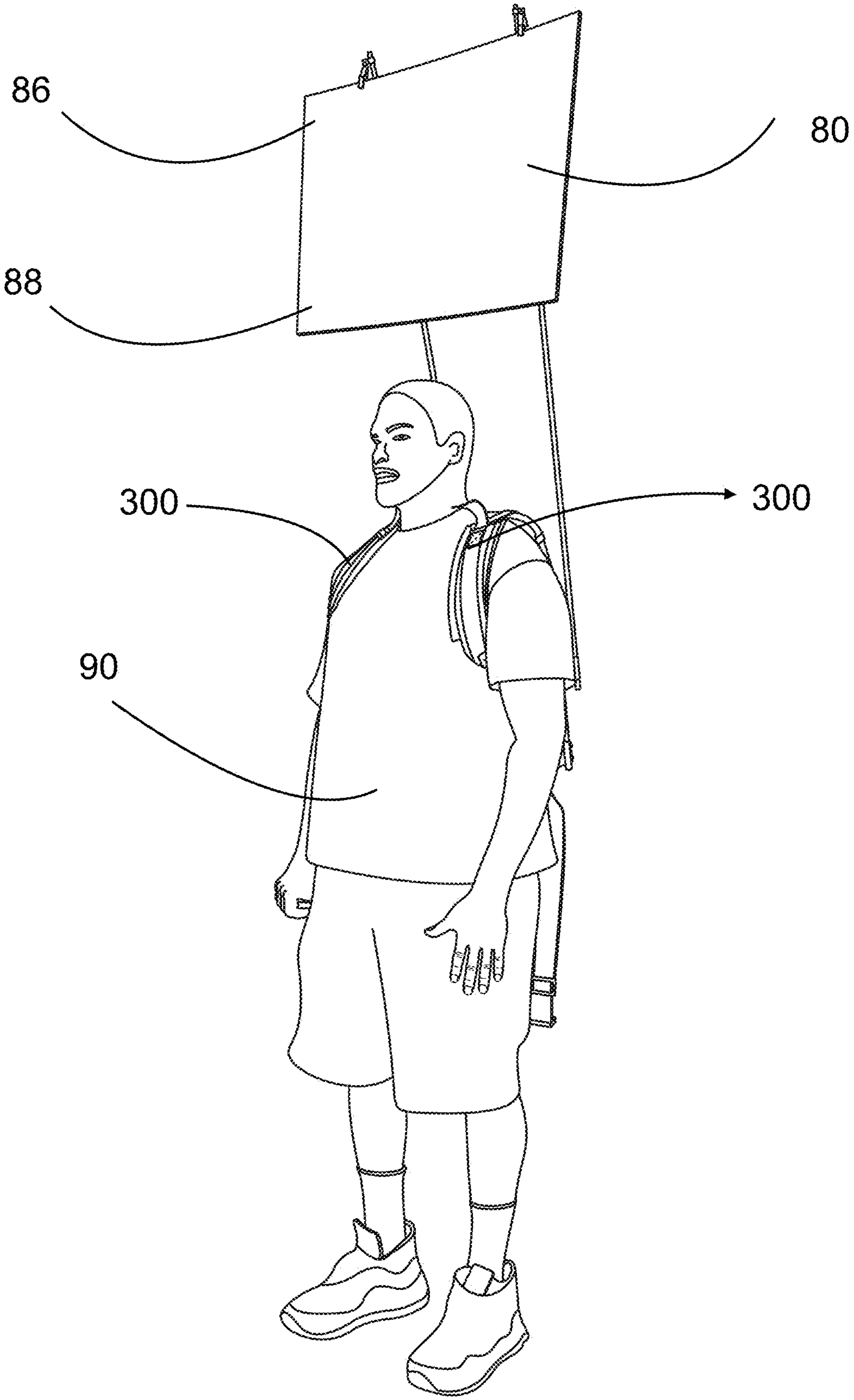
FIG. 3 shows the Hands-Free Sign Holder (100) being worn by a user (90)

The sign holder (100) allows a user (90) to carry a sign (80) that can be seen above a crowd or over large distances. The sign holder (100) can also be used for advertisement, safety warning, picketing, protesting, and tour guide group signaling. Sign types that would be suitable for the sign holder (100) include paperboard, cardboard (corrugated), plastic, cloth, and any other material on which an image or text can be applied. FIG. 3 show a user (90) wearing the sign holder (100) with a sign (80) fastened to the sign holder (100).

(J) 1 Back Structure (200)

The back structure (200) is rigid, providing structural support to the sign holder (100) when the user (90) wears the sign holder (100) on their back. The rigidity of the back structure (200) allows the sign holder (100) to be easily worn on a user's back; the rigid back structure (200) also allows upright rods (400) to be connected to the back structure (200) without falling or sagging.

The back structure (200) may comprise a single solid piece. Alternatively, the back structure (200) may comprise a frame (230). The frame (230) is comprised of a plurality of members (232).

The plurality of members (232) maybe arranged as outer members (250), creating a hollow frame, where the hollow frame comprises a single aperture (260).

The plurality of members (232) may be arranged as outer members (250) and inner members (240). The outer members (250) and inner members (240) may be arranged in a grid-like pattern and have a plurality of apertures (260). FIG. 2 shows a back structure (200) comprising a frame (230). The frame (230) comprises a plurality of members (232). The plurality of members (232) are arranged as outer members (250) and inner members (240). The frame also comprises a plurality of apertures (260).

(J) 2 Shoulder Supported Members (300)

Shoulder supported members (300) allow a user (90) to carry the sign holder (100) over the shoulders (92) of the user (90). The shoulder supported member (300) may be a rigid structure—e.g. a shoulder bar—or a non-rigid structure—e.g. a shoulder strap. FIG. 3 shows a user (90) carrying a sign holder (100) with two shoulder supported members (300) in the form of shoulder straps.

Figure 10:
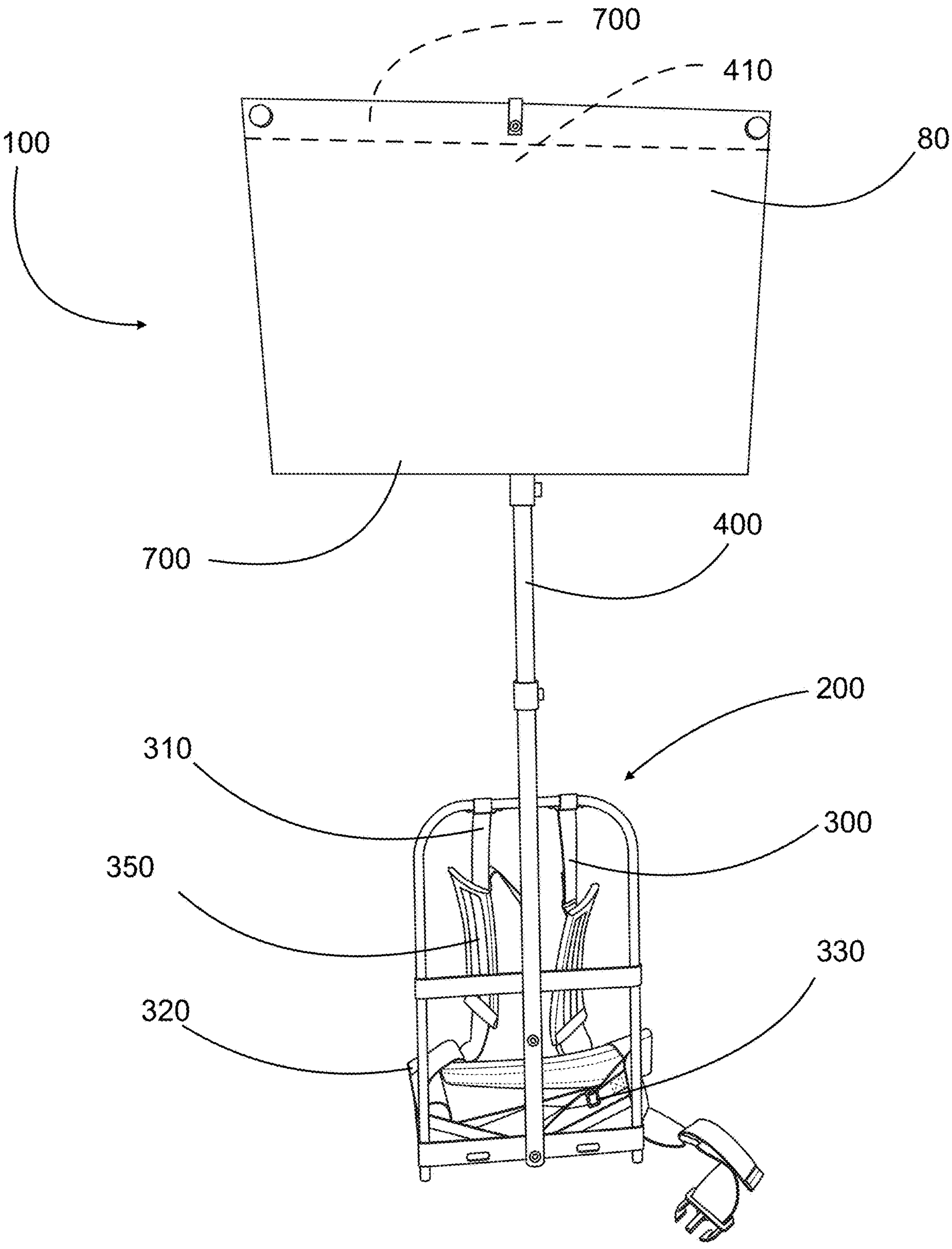
FIG. 10 shows a single cross-rod (700) attached to the upright rod (400), where two sign fasteners (600) fasten a sign (80) to the cross-rod (700).

The shoulder supported member (300) has a first end (310) and a second end (320). The shoulder supported member (300) are attached to the back structure (200) by at least the first end (310) of the shoulder supported member (300)—e.g. a shoulder bar. The shoulder supported member (300) may also be attached to the back structure (200) by the second end (320) of the shoulder supported member (300)—e.g. a shoulder strap. FIG. 10 shows a sign holder (100) comprising two shoulder supported members (300) in the form of shoulder straps. The first end (310) of each shoulder strap and the second end (320) of each shoulder strap are attached to the back structure (200).

Figure 4:
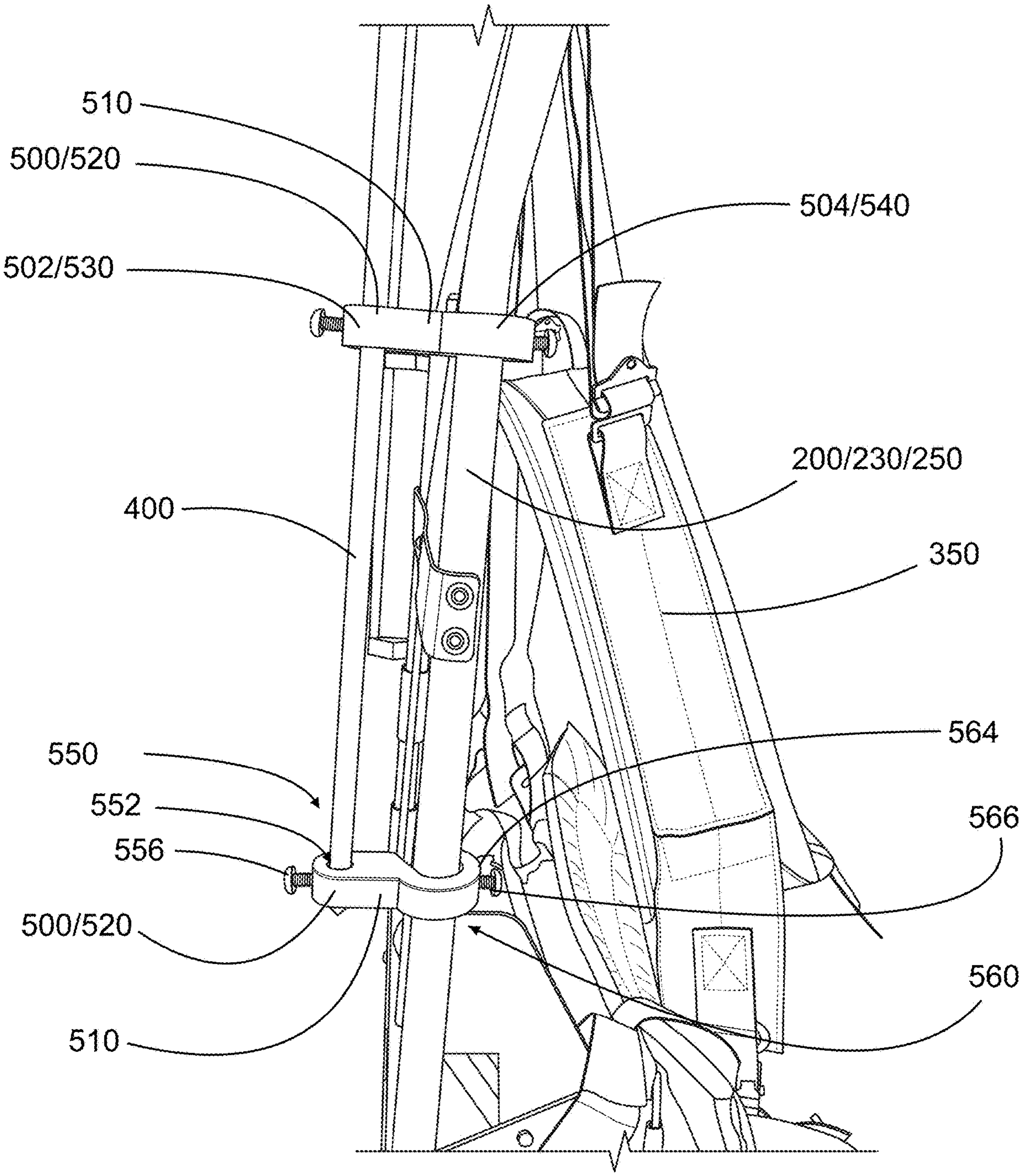
FIG. 4 shows two connector assemblies (500) as double fastener connector assemblies (520), where the first end (502) has a first fastener (530) as a rod clamp (550), where the second end (504) has a second fastener (540) as a J-shaped clamp (560)

Each shoulder supported member (300) may further comprise a buckle (330) that can adjust the length of the shoulder supported member (300), allowing for a wide spectrum of users' sizes and girths. FIG. 4 shows a sign holder (100) with each shoulder supported member (300) comprising a buckle (330) to adjust its length.

Each shoulder supported member (300) may further comprise a shoulder pad (350). Having the shoulder supported member (300) being padded helps the user (90) carry the sign holder (100) for an extended amount of time. FIG. 4 shows a sign holder (100) with each padded shoulder supported members (300) comprising a shoulder pad (350).

The shoulder supported member (300) maybe complemented by a back pad (340). The back pad (340) is attached to either the back structure (200) or to the shoulder supported members (300). The back pad (340) allows for cushioning between the user's back and the back structure (200). This allows for extended use of the sign holder (100) by the user. FIG. 1 shows a back pad (340) attached to the back structure (200) of the sign holder (100).

(J) 3 Upright Rods (400)

One or more upright rods (400) elevate the signs (80) above crowd level, providing increased visibility for the signs (80). The material of the one or more upright rods (400) is selected from state-of-the-art light weight materials. The length of the one or more upright rods (400) is selected to allow for a variety of elevations above crowd level. The upright rod (400) may have any state-of-the-art cross section, including but not limited to circular, elliptical, square, or rectangular. FIG. 1 and FIG. 2 shows how a sign (80) is fastened to two upright rods (400), allowing the sign holder (100) to provide visibility above crowd level to the sign (80).

Figure 8:
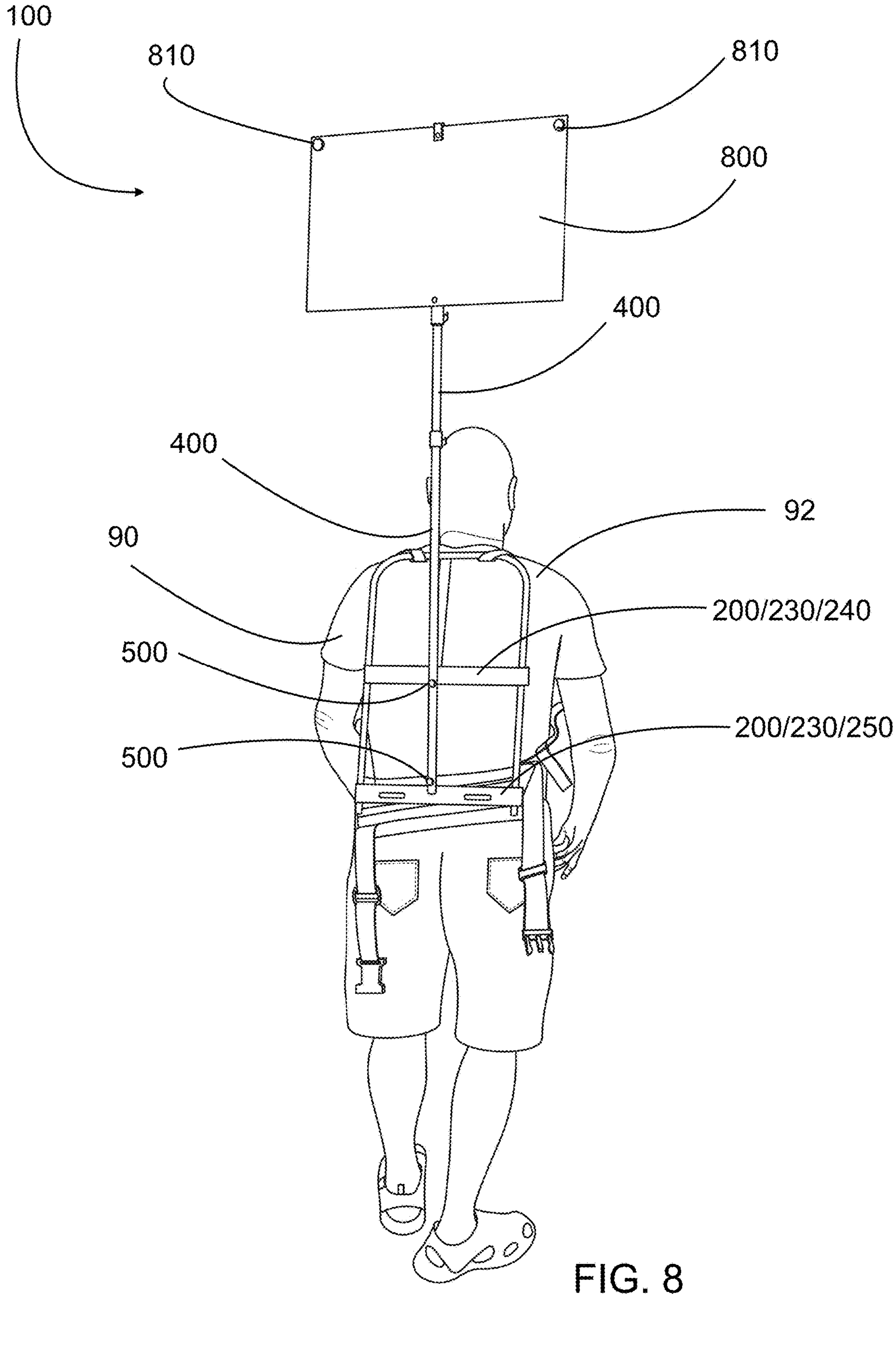
FIG. 8 shows a back view the Hands-Free Sign Holder (100) being worn by a user (90), with a telescoping upright rod (400) in a telescoped state. It shows the ferromagnetic metal board (800) attached to one upright rod (400) at two points.

When the sign holder comprises one upright rod (400), the upright rod (400) is normally centered widthwise on the back structure (200). However, the upright rod (400) maybe positioned at any position widthwise on the back structure (200). FIG. 8 shows one upright rod (400) centered widthwise on and attached to the back structure (200). The back structure (200) comprises a frame (230).

When the sign holder (100) comprises two upright rods (400), the upright rods (400) are normally positioned at either end of the back structure (200), widthwise. FIG. 1 and FIG. 2 show one upright rod (400) positioned at a first end (210) of the back structure (200) and the other upright rod (400) positioned at a second end (220) of the back structure (200).

Each upright rod (400) has a top end (410) and a bottom end (420). The one or more upright rods (400) may be connected directly to the back structure (200). Alternatively, each of the one or more upright rods (400) may be connected to the back structure (200) by connector assembly (500).

A variety of lengths can be utilized to size the upright rod (400), depending on the desired visibility above crowd level the upright rod (400) need to elevate the sign (80).

Figure 9:
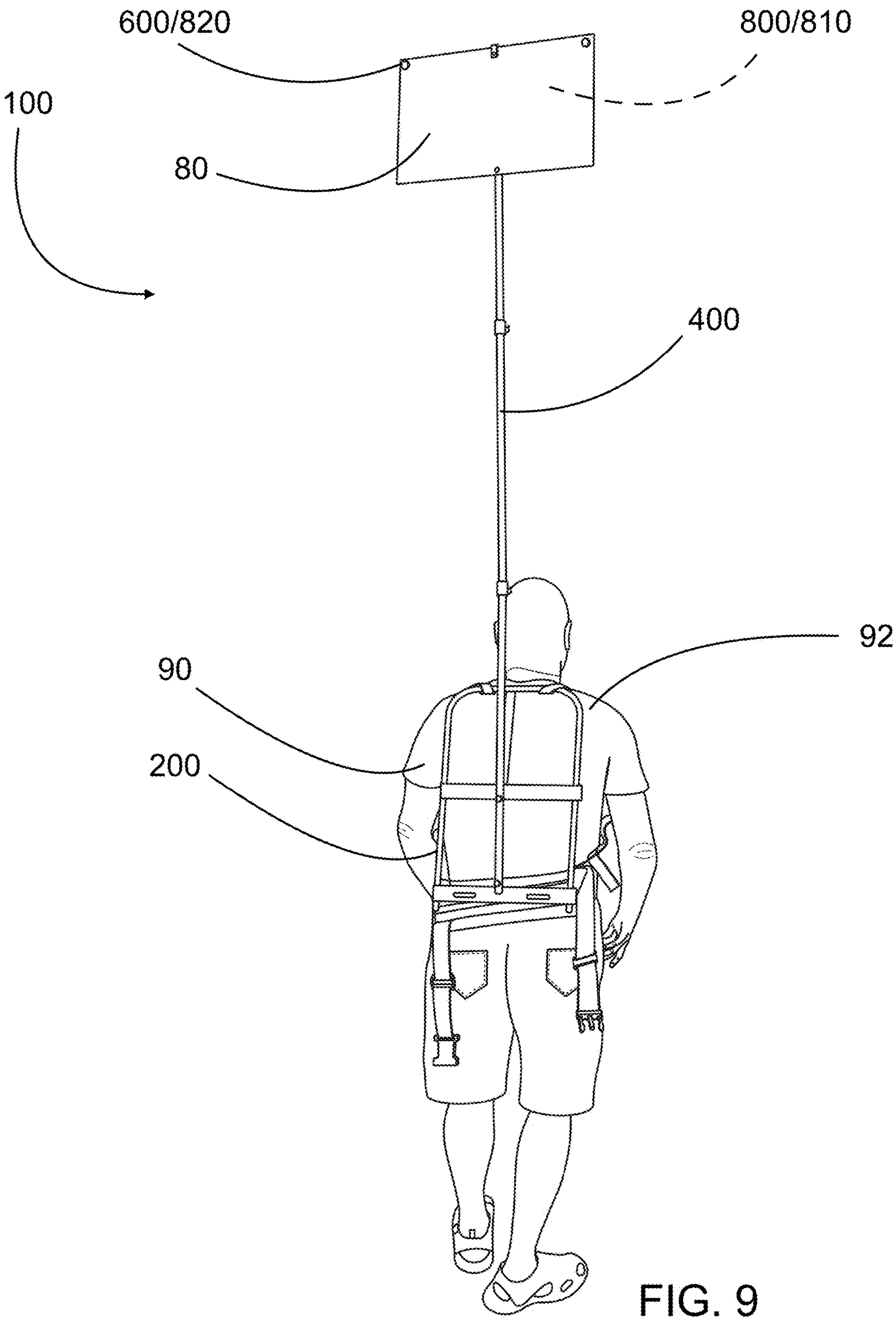
FIG. 9 shows a back view the Hands-Free Sign Holder (100) being worn by a user (90), with a telescoping upright rod (400) in a telescoped state. It shows the ferromagnetic metal board (800) attached to one upright rod (400) at two points.

The one or more upright rods (400) maybe telescoping, where the upright rod (400) is either in a telescoped state or in a non-telescoped state. The one or more upright rods (400) can be placed in a non-telescoped state, so that for example, the sign holder (100) can be easily transported from one place to the other, or when the displayed sign (80) only needs to be viewed at a close distance. The one or more upright rods (400) can be placed in a telescoped state so that the displayed sign (80) is seen at a longer distance. In a telescoped state, the upright rods (400) can be telescoped to various lengths. FIG. 8 shows an embodiment of the sign holder (100), which has a telescoping upright rod (400) in a telescoped state at a medium length. FIG. 9 shows an embodiment of the sign holder (100), which has a telescoping upright rod (400) in a telescoped state at a long length.

(J) 4 Connector Assembly (500)

The Connector Assembly (500) comprises a rod (510), a first end (502), and a second end (504).

One or more connector assemblies (500) may connect each upright rod (400) to the back structure (200). Preferably two connector assemblies (500) connect each upright rod (400) to the back structure (200). FIG. 4 shows two connector assemblies (500) connecting an upright rod (400) to the back structure (200).

The connector assembly (500) is located between an upright rod (400) and the back structure (200), where the connector assembly (500) connects the upright rod (400) to the back structure (200).

The connector assembly (500) may have either a permanent attachment to the upright rod (400) or a removable attachment to the upright rod (400). The connector assembly (500) may have either a permanent attachment to the back structure (200) or a removable attachment to the back structure (200). Examples of a permanent attachment include soldering, riveting, and gluing. Examples of a removable attachment include hooks, bolts, screws, nuts, snaps, pins, clasps, magnets, sticky substances, and clamps.

FIG. 4 shows a removable attachment between a connector assembly (500) and the upright rod (400). FIG. 2 shows a permanent attachment between a connector assembly (500) and the upright rod (400).

FIG. 4 shows a removable attachment between a connector assembly and the back structure (200). FIG. 1 shows a permanent attachment between a connector assembly (500) and the back structure (200).

When the back structure (200) comprises a frame (230), the connector assembly (500) is connected to the frame (230). FIG. 4 shows two connector assemblies (500) connecting an upright rod (400) to the frame (230) of the back structure (200).

When the back structure (200) comprises a frame (230), and the frame (230) comprises outer members (250) and inner members (240), the connector assembly (500) may be connected to either the outer members (250), the inner members (240) or both. FIG. 4 shows two connector assemblies (500) connecting an upright rod (400) to the outer member (250) of the frame (230) of the back structure (200). FIG. 8 shows a connector assembly (500) connecting an upright rod (400) to the inner member (240) of the frame (230) of the back structure (200) and a connector assembly (500) connecting an upright rod (400) to the outer member (250) of the frame (230) of the back structure.

(J) 4.1 Double Fastener Connector Assembly (520)

A specific type of connector assembly (500) with removable fasteners is the double fastener connector assembly (520). The first end (502) comprises a first fastener (530) and the second end (504) comprises a second fastener (540). The double fastener connector assembly (520) allows for quick and easy assembly and disassembly. FIG. 4 shows two double fastener connector assemblies (520) connecting an upright rod (400) to the outer member (250) of the frame (230) of the back structure (200).

The first fastener (530) fastens to the upright rod (400) and the second fastener (540) fastens to the back structure (200). The type of fastener is dictated by the shape of the upright rod (400) and the back structure (200) and includes any state-of-the-art fasteners that create an removable attachment. Examples of a removable attachment include hooks, bolts, screws, nuts, snaps, pins, clasps, magnets, sticky substances, and clamps.

(J) 4.2 Double Fastener Connector Assembly (520) Embodiments

In an embodiment, the first fastener (530) is a rod clamp (550). The rod clamp (550) fastens to the upright rod (400). The rod clamp (550) comprises a bore (552), a threaded shaft (554), and a bolt (556). The threaded shaft (554) of the rod clamp (550) is aligned perpendicularly to the center axis of the bore (552). A upright rod (400) is placed through the bore (552) of the rod clamp (550). The bolt (556) is fastened through the threaded shaft (554) of the rod clamp (550). The thread of the bolt (556) needs to be compatible with the threaded shaft (554) of the rod clamp (550). The bolt (556) is fastened through the threaded shaft (554) of the rod clamp (550) until the bolt (556) fastens against the upright rod (400). FIG. 4 shows the first fastener (530) as a rod clamp (550). A bolt (556) is fastened through the threaded shaft (554) of the rod clamp (550).

In this embodiment, the second fastener (540) is a J-shaped clamp (560). The J-shaped clamp (560) fastens to the back structure (200). The shape of the J-shaped clamp (560) is curved and has an open end (562), allowing the J-shaped clamp (560) to be inserted onto the back structure (200) without any back structure (200) disassembly; the J-shaped clamp (560) is useful in a number of back structure (200) configurations. The J-shaped clamp (560) comprises a threaded shaft (564) and a bolt (566). The bolt (566) is fastened through the threaded shaft (564) of the J-shaped clamp (560). The thread of the bolt (566) needs to be compatible with the threaded hole (564) of the J-shaped clamp (560). The bolt (566) is fastened through the threaded hole (564) of the J-shaped clamp (560) until it fastens against the back structure (200). FIG. 4 shows the second fastener (540) as a J-shaped clamp (560). A bolt (566) is threaded through the threaded hole (564) of the J-shaped clamp (560).

(J) 4.3 Assembly of Double Fastener Connector Assembly (520) Embodiments

One or more double fastener connector assemblies (520) are used to attach each upright rod (400) to the back structure (200). The upright rod (400) is fastened by the first fastener (530) of each corresponding double fastener connector assembly (520). The second fastener (540) of each double fastener connector assembly (520) is fastened to the back structure (200). FIG. 4 shows an upright rod (400) fastened by two double fastener connector assemblies (520) in one side of the back structure (200).

The double fastener connector assembly (520) for each corresponding upright rod (400) are spaced out height wise to even out the forces that the upright rod (400) places onto the back structure (200). For example, when there are two double fastener connector assemblies (520) per upright rod (400), the first double fastener connector assembly (520) is fastened towards the top end of the back structure (200) and the second double fastener connector assembly (520) is fastened towards the bottom end of the back structure (200). FIG. 4 shows a first double fastener connector assembly (520) fastened towards the top end of the back structure (200) and the second double fastener connector assembly (520) fastened towards the bottom end of the back structure (200).

(J) 5 Sign Fasteners (600)

Sign fasteners (600) allow for the fastening of a sign (80) to the sign holder (100). Sign fasteners (600) also allow for the unfastening of the sign (80) to the sign holder (100) so that a different sign (80) can be used with the sign holder (100).

A sign fastener (600) can attach to either an upright rod (400), a cross-rod (700) or both, or a board (800).

(J) 5.1 Sign Fasteners (600) Attached to an Upright Rod (400)

When a sign fastener (600) is attached to an upright rod (400), one or more sign fasteners (600) are used per each upright rod (400).

A second sign fastener (600) may be attached at a point on each upright rod (400) that is lower than the point where the first sign fastener (600) is attached to. The use of two sign fastener (600) per upright rod (400) prevents signs (80) from moving and flapping around, minimizing mobility issues with the sign holder (100) or reading issues with the sign reader. FIG. 1 and FIG. 2 shows a sign holder (100), where two sign fasteners (600) are attached to each upright rod (400). A first sign fastener (600) is attached to the top end (410) of each upright rod (400), and a second sign fastener (600) is attached to a lower part of each upright rod (400).

Two specific embodiments of a sign fastener (600) include ended sign fasteners (610) and L-shaped sign fasteners (650).

(J) 6 Ended Sign Fasteners (610)

An ended sign fastener (610) comprises a first end (612) and a second end (614). The first end (612) of the ended sign fastener (610) is attached to the upright rods (400), preferably near the top end (410) of the corresponding upright rod (400).

The second end (614) of an ended sign fasteners (610) may comprise a means to fasten a sign (610). The means to fasten a sign (610) is attached to the second end (614) of the sign fastener (600).

(J) 6.1 Means to Fasten a Sign (610)

The means to fasten a sign (610) is any state-of-the-art device that can be used to fasten to objects or fasten objects. These devices include hooks, bolts, screws, nuts, snaps, pins, clasps, magnets, sticky substances, and clamps. When the means to fasten a sign (610) is a sticky substance, the sticky substance is layered over ("attaches") to the second end (614) of the ended sign fastener (610). The means to fasten a sign (610) fastens to the sign (80) and allows a sign (80) to be fastened to the sign holder (100).

Magnets are especially useful as a means to fasten a sign (610), either if the sign (80) is ferromagnetic or the magnet can attach to a ferromagnetic surface, fastening the sign (80) in between the magnet and the ferromagnetic surface.

FIG. 1 shows a sign holder (100) with a single means to fasten a sign (610) per each upright rod (400). The first end (612) of the ended sign fastener (610) is attached to each corresponding upright rod (400). The second end (614) of the ended sign fastener (610) is attached to each corresponding means to fasten a sign (610).

(J) 6.2 L-shaped Sign Fastener (650)

An L-shaped sign fastener (650) comprises a regular volume (660), one or more L-shaped brackets (670), and a bolt (680). The regular volume (660) comprises a bore (662), a threaded shaft (664), a top end (666) and a bottom end (668). The regular volume (660), for example, can be a cylinder, a cube, or a rectangular prism. The bore comprises a central axis (663).

An upright rod (400) is inserted through the bore (662) of the regular volume (660) of the L-shaped sign fastener (650). The diameter of the bore (662) is such that an upright rod (400) can be inserted through the bore (662) of the regular volume (660) of the L-shaped sign fastener (650).

The threaded shaft (664) is oriented perpendicular to the bore (662), spanning from the outside of the regular volume (660) to the bore (662).

Figure 5:
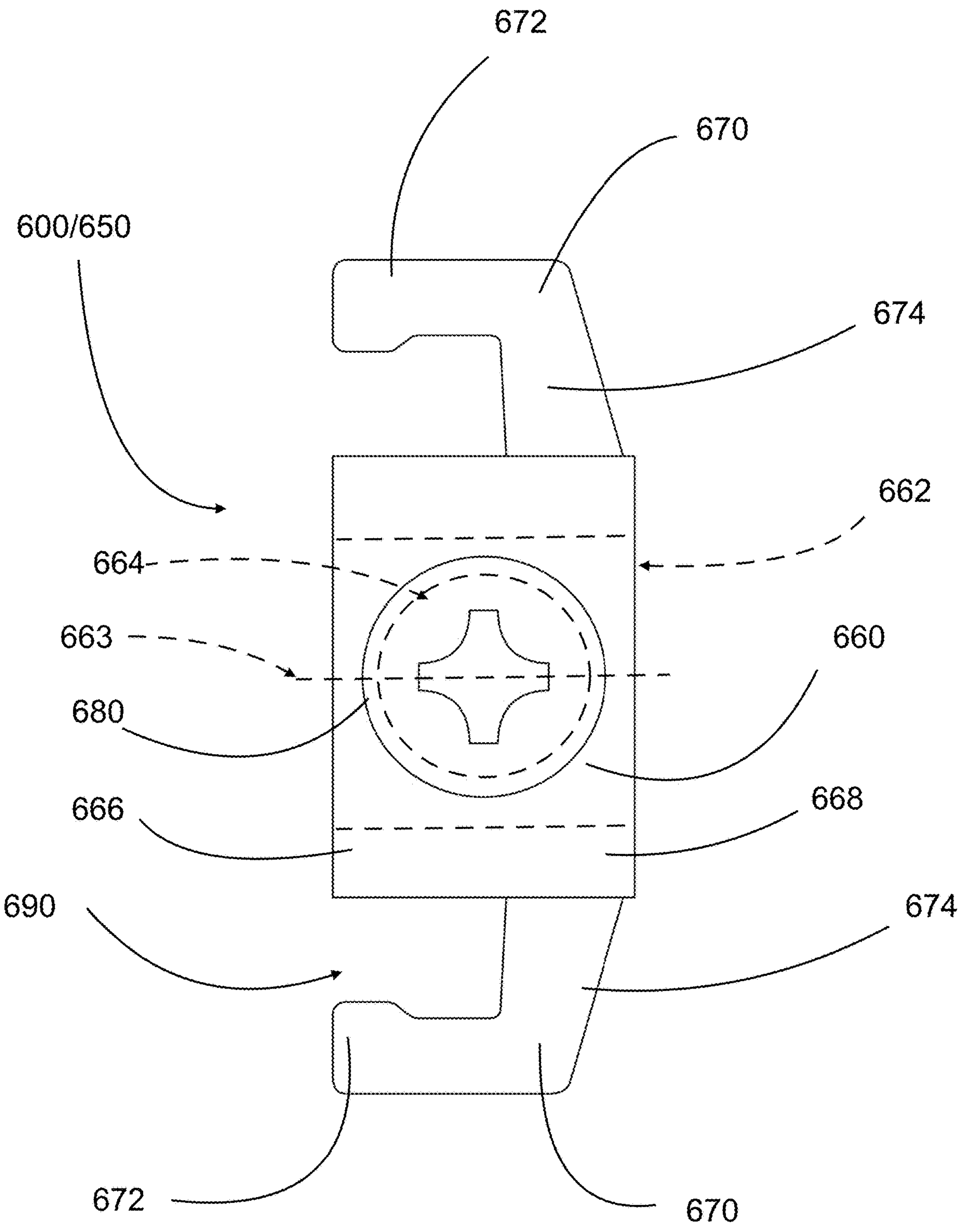
FIG. 5 shows the side view of an L-shaped sign fastener (650)

The bolt (680) is fastened into the threaded shaft (664) so that the bolt (680) can be fastened against the upright rod (400). FIG. 5 shows a side view of a L-shaped sign fastener (650) with the regular volume (660) in the shape of a cylinder, with a threaded shaft (664), and two L-shaped brackets (670). A bolt (680) is fastened into the threaded shaft (664).

L-shaped brackets (670) allow for the fastening of signs (80) to the sign fastener (600). Each L-shaped bracket (670) comprises a vertical member (672) and a horizontal member (674). The vertical member (672) is oriented parallel to the central axis (663) of the bore (662). The horizontal member (674) is oriented perpendicular to the vertical member (672) of the L-shaped bracket (670) and perpendicular to the central axis (663) of the bore (662). The horizontal member (674) of each L-shaped bracket (670) is attached to the bottom end (668) of the regular volume (660), creating a gap (690) between the vertical member (672) of the L-shaped bracket (670) and the regular volume (660).

FIG. 5 shows a side view of the L-shaped sign fastener (650), with two L-shaped brackets (670) attached to the regular volume (660). Within this gap (690), the edge of a sign (80) is fastened, between the vertical member (672) of the L-shaped bracket (670) and the regular volume (660). The horizontal member (674) of the L-shaped bracket (670) provides a resting place for the edge of the sign (80) being fastened.

Figure 6:
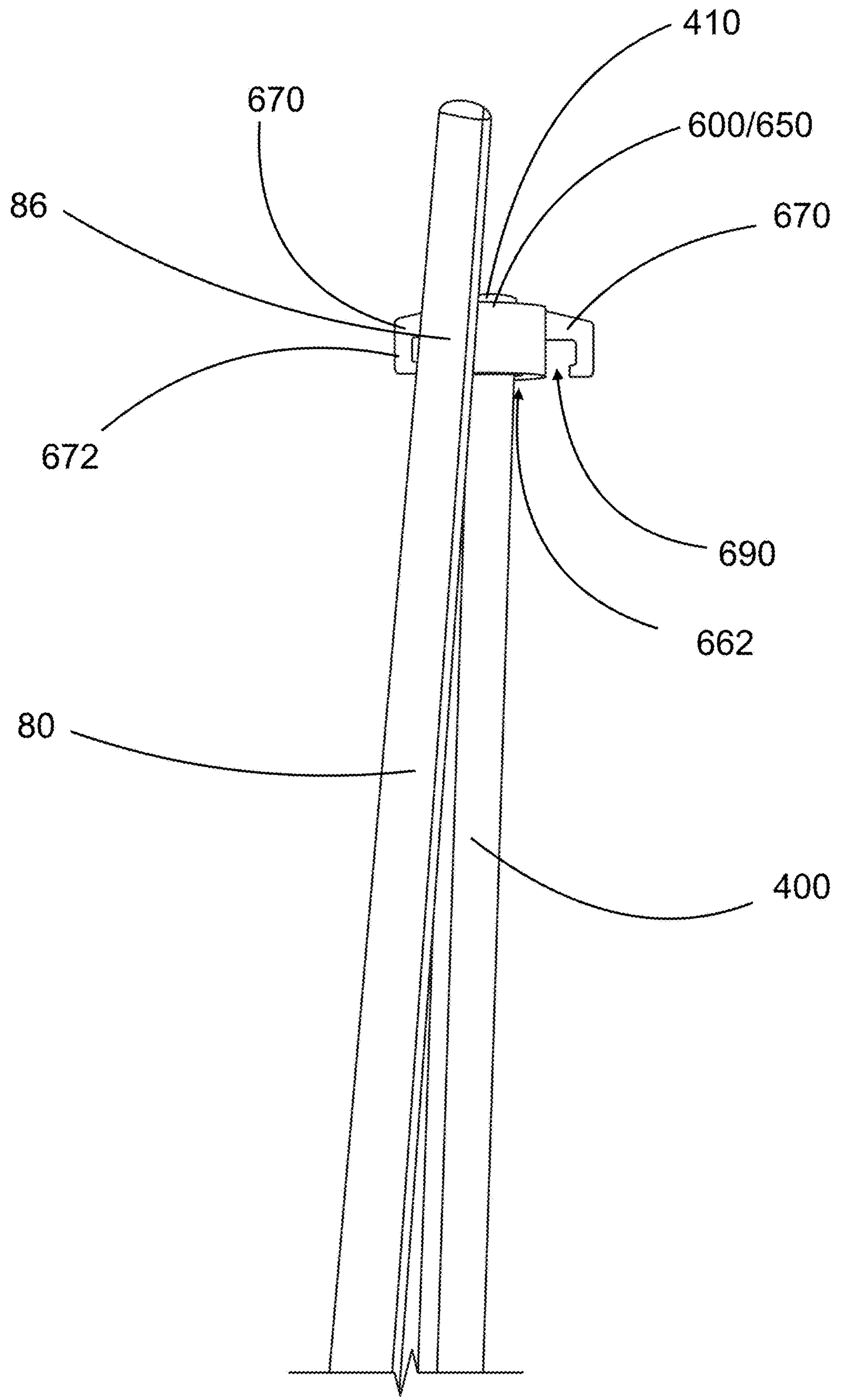
FIG. 6 shows a sign fastener (600) fastened to the top end (410) of an upright rod (400), with the top end (86) of a sign (80) fastened between the vertical member (672) of the L-shaped bracket (670) and the regular volume (660) of the sign fastener (600)

When the L-shaped sign fastener (650) comprises one L-shaped bracket (670), the sign holder (100) has a capacity of displaying the front (82) and back (84) of one sign (80). When the L-shaped sign fastener (650) comprises two L-shaped brackets (670), the sign holder (100) has the capacity of displaying either the front (82) or back (84) of two signs (80). This would be helpful when one side of the sign (80) has no useful content. FIG. 6 shows an L-shaped sign fastener (650) fastened to an upright rod (400), where one sign (80) is fastened to one L-shaped bracket (670).

Figure 7:
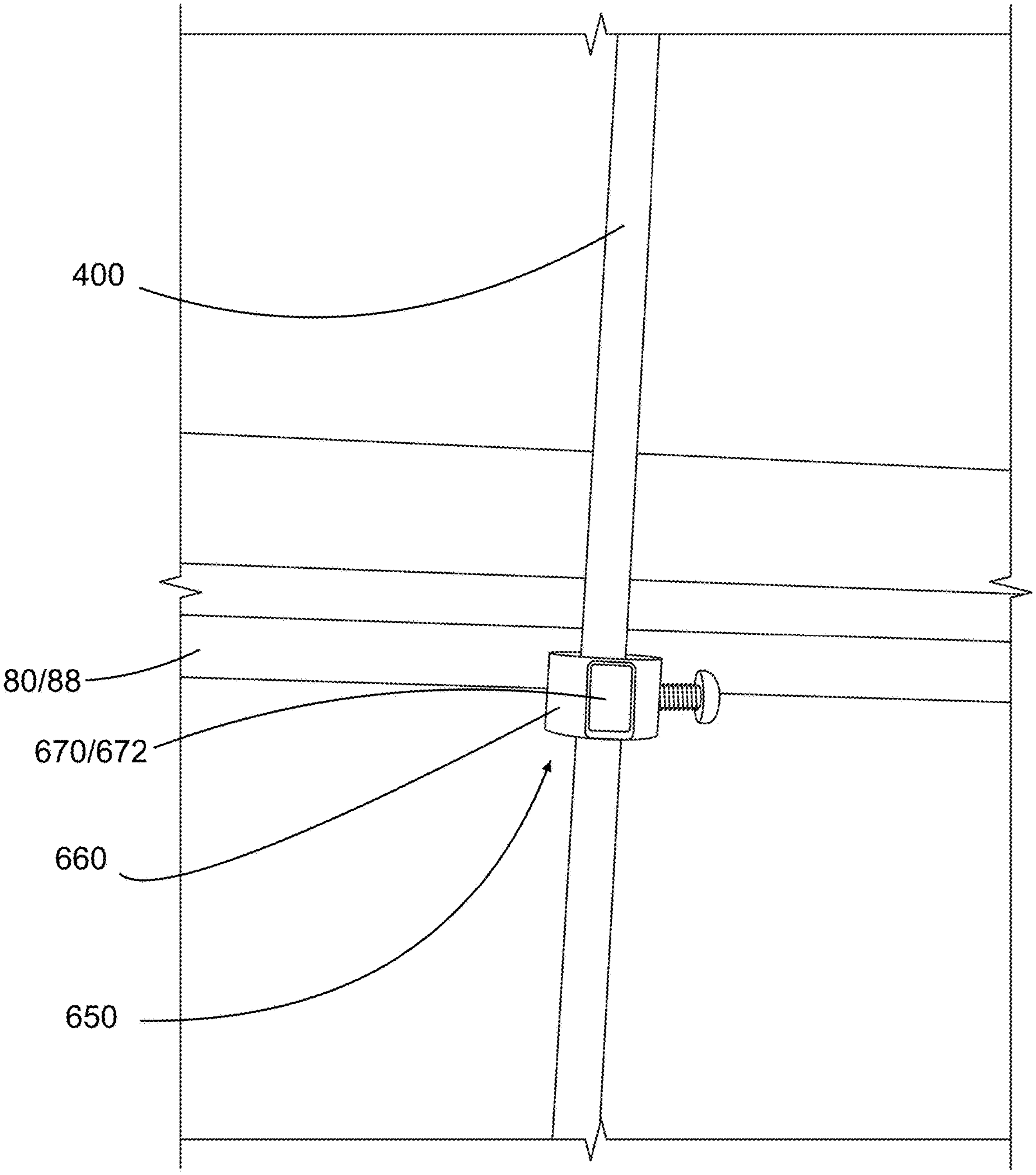
FIG. 7 shows a sign fastener (600) in the shape of an L-shaped sign fastener (650) fastened to an upright rod (400), with the bottom end (88) of a sign (80) fastened between the vertical member (672) of the L-shaped bracket (670) and the regular volume (660) of the sign fastener (600)

To assemble a sign holder (100) comprising L-shaped sign fasteners (650), two L-shaped sign fasteners (650) are used per upright rod (400). The bore (662) of the first L-shaped Sign Fastener (650) is placed through the upright rod (400) so that the vertical member (672) of the L-shaped bracket (670) is oriented upwards. This L-shaped sign fastener (650) is moved downwards through the upright rod (400) to a location where the bottom end (88) of the sign (80) should be placed. FIG. 7 shows the bottom end (88) of a sign (80) fastened between the vertical member (672) of the L-shaped bracket (670) and the regular volume (660) of the L-shaped sign fastener (650).

The bore (662) of the second L-shaped sign fastener (650) is placed through the upright rod (400) so that the vertical member (672) of the L-shaped bracket (670) is oriented downwards. The second L-shaped sign fastener (650) is moved downwards through the upright rod (400) to a location where the top end of the sign (80) should be place. Normally this location of the second L-shaped sign fastener (650) is the top end (410) of the upright rod (400). FIG. 6 shows the top end (86) of a sign (80) fastened between the vertical member (672) of the L-shaped bracket (670) and the regular volume (660) of the sign fastener (600).

Both L-shaped sign fastener (650) are moved along the corresponding upright rod (400) so that the sign (80) fits snuggly between the two L-shaped sign fasteners (650), specifically the L-shaped bracket (670) of the two L-shaped sign fasteners (650). The bolts (680) of each L-shaped sign fastener (650) are fastened against the corresponding upright rod (400).

(J) 6.3 Cross-Rods (700)

A sign holder (100) may further comprise one or more cross-rods (700). Cross-rods (700) stabilize the uprights rods (400) and the sign (80) against torque and other forces placed on the sign holder (100). One or more sign fasteners (600) are attached to each cross-rod (700). The cross-rods (700) maybe attached to the upright rods (400) facing forwards, facing backwards, or both, relative to the back structure (200). FIG. 10 shows a cross-rod (700) attached to the upright rod (400), facing backwards relative to the back structure (200).

The one or more cross-rods (700) are attached to the upright rods (400). One or more sign fasteners (600) for each cross-rod (700) are attached to each cross-rod (700). The cross-rods (700) are oriented perpendicular to the upright rods (400).

When the sign holder (100) comprises a single cross-rod (700), the cross-rod (700) is attached near to the top end (410) of the upright rods (400) so that the sign fasteners (600) attach to the top of the sign (80). FIG. 10 shows a single cross-rod (700) attached to the upright rod (400), where two sign fasteners (600) fasten a sign (80) to the cross-rod (700).

When the sign holder (100) comprises a plurality of cross-rods (700), each cross-rod (700) can fasten to the sign (80).

When the sign holder (100) comprises two cross-rods (700), a first cross-rod (700) is attached to the upright rods (400) so that the sign fasteners (600) of the first cross-rod (700) attach to the top end of the sign (80). A second cross-rod (700) is attached to the upright rods (400) so that the sign fasteners (600) of the second cross-rod (700) attach to the bottom end of the sign (80).

Using two cross-rods (700) for a single sign (80) prevents the sign (80) from moving and flapping around, as the two cross-rods (700) attach to the top end and the bottom end of the sign (80).

Multiple sets of two cross-rods (700) maybe attached to the upright rods (400) connected to the back structure (200). The sets of two cross-rods (700) maybe attached to the top end of the upright rods (400) or to the bottom end of the upright rods (400). The sets of two cross-rods (700) maybe attached facing forwards, facing backward or both, relative to the back structure (200).

(J) 6.4 Board (800)

A sign holder (100) may further comprise a board (800). The board (800) is attached to either one or more upright rods (400) or one or more cross-rods (700) or both. The board (800) is attached the upright rods (400) or the cross-rods (700) at one or more points. One or more sign fasteners (600) are attached to the board (800).

A sign (80) is placed against the board (800) and one or more sign fasteners (600) fasten the board (800) to the sign (80).

(J) 6.5 Ferromagnetic Metal Board (810) and Magnets (820)

When a sign holder (100) comprises a board (800), the board (800) may be a ferromagnetic metal board (810). In this embodiment, the sign fastener (600) is one or more magnets (820). The ferromagnetic metal board (810) is attached to either one or more upright rods (400) or one or more cross-rods (700) or both. The ferromagnetic metal board (810) is attached the upright rods (400) or the cross-rods (700) at one or more points. FIG. 8 and FIG. 9 show the ferromagnetic metal board (810) attached to one upright rod (400) at two points.

A sign (80) is placed against the ferromagnetic metal board (810) and the one or more magnets (820) are placed against the sign (80) so that the sign (80) is fastened between the ferromagnetic metal board (810) and the one or more magnets (820).

(J) 6.6 Chest Level Usage

Each shoulder supported member (300) may further comprise one or more sign fasteners (600). Having a sign fastener (600) attached or fastened to the shoulder supported members (300) allows an additional sign (80) to be worn chest level.

For example, the one or more sign fasteners (600) can be attached to the shoulder supported members (300) at chest level, or at stomach level, or both.

(J) 7 Clarifying Comments

While the foregoing written description of the invention enables a person having ordinary skill in the art to make and use what is considered presently to be the best mode thereof, those of ordinary skill in the art will understand and appreciate the existence of variations, combinations, and equivalents of the specific embodiment, process, and examples herein. The invention should therefore not be limited by the above described embodiment, process, and examples, but by all embodiments and processes within the scope and spirit of the invention.

The inventions shown and described herein may be used to address one or more of such problems or other problems not set out herein and/or which are only understood or appreciated at a later time. The future may also bring to light currently unknown or unrecognized benefits which may be appreciated, or more fully appreciated, in association with the inventions shown and described herein. The desires and expected benefits explained herein are not admissions that others have recognized such prior needs, since invention and discovery are both inventive under the law and may relate to the inventions described herein.

What is claimed is:

1. A sign-holder that allows a person to hold a sign without the use of their hands, the sign-holder comprising:

(a) a back structure;

(b) two shoulder supported members; each shoulder supported member comprising:

(i) a first end;

(ii) a second end;

(iii) where the shoulder supported members are attached to the back structure;

(c) one or more upright rods;

(d) one or more sign fasteners per each upright rod;

(e) one or more connector assemblies per each upright rod;

(f) where each connector assembly fastens the back structure to the corresponding rod, (g) where the one or more sign fasteners per each upright rod are located and attached to the corresponding upright rod so that the one or more sign fasteners can fasten and unfasten to the edges of the sign;

(h) where the one or more sign fasteners per each upright rod fasten to the edges of the sign;

(i) wherein each connector assembly comprises:

(i) a rod;

(ii) a first end; the first end comprises:

(1) a first fastener;

(iii) a second end; the second end comprises:

(1) a second fastener.

2. The sign-holder described in claim 1, (a) wherein the first fastener of the first end of each connector assembly creates a removable attachment;

(b) wherein the second fastener of the second end of each connector assembly creates a removable attachment.

3. The sign-holder described in claim 2, (a) wherein the first fastener of the first end of each connector assembly comprises a rod clamp, the rod clamp comprising:

(i) a bore;

(ii) a threaded hole; and (iii) a bolt;

(b) wherein the second fastener of the second end of each connector assembly comprises a J-shaped clamp, the J-shaped clamp comprising:

(i) a threaded hole; and (ii) a bolt;

(c) where the bolt of the rod clamp is fastened to the threaded hole of the rod clamp so that the bolt of the rod clamp fastens against the corresponding upright rod, (d) where the bolt of the J-shaped clamp is fastened to the threaded hole of the J-shaped clamp so that the bolt of the J-shaped clamp fastens against the back structure.

4. A sign-holder that allows a person to hold a sign without the use of their hands, the sign-holder comprising:

(a) a back structure;
(b) two shoulder supported members; each shoulder supported member comprising:
(i) a first end;
ii) a second end;
(iii) where the shoulder supported members are attached to the back structure;
(c) one or more upright rods;
(d) one or more sign fasteners per each upright rod;
(e) one or more connector assemblies per each upright rod;
(f) where each connector assembly fastens the back structure to the corresponding rod,
(g) where the one or more sign fasteners per each upright rod are located and attached to the corresponding upright rod so that the one or more sign fasteners can fasten and unfasten to the edges of the sign;
(h) where the one or more sign fasteners per each upright rod fasten to the edges of the sign;
(i) wherein each sign fastener comprises:
(i) a regular volume; the regular volume comprising:
(1) a bore; the bore comprising:
(a) a central axis;
(2) a threaded shaft;
(3) a top end; and
(4) a bottom end;
(ii) one or more L-shaped brackets; each L-shaped bracket comprising:
(1) a vertical member;
(2) a horizontal member;
(iii) a bolt;
(iv) where the bolt is fastened into the threaded shaft to fasten the sign fastener to the corresponding upright rod;
(v) where the horizontal member of each L-shaped bracket is oriented perpendicular to the central axis of the bore of the regular volume,
(vi) where the vertical member of each L-shaped bracket is oriented parallel to the central axis of the bore of the regular volume,
(vii) where the horizontal member of each L-shaped bracket is attached to the bottom end of the regular volume, creating a gap between the vertical member and the regular volume, providing a resting place for the sign.

5. The sign-holder described in claim 4,
(a) wherein the one or more upright rods are telescoping.

6. A sign-holder that allows a person to hold a sign without the use of their hands, the sign-holder comprising:
(a) a back structure;
(b) two shoulder supported members; each shoulder supported member comprising:
(i) a first end;
(ii) a second end;
(iii) where the shoulder supported members are attached to the back structure;
(c) one or more upright rods;
(d) one or more boards;
(e) one or more sign fasteners;
(f) one or more connector assemblies per each upright rod;
(g) where the one or more sign fasteners are located and attached to the one or more boards so that the plurality of the sign fasteners can fasten and unfasten to the edges of the sign,
(h) where each connector assembly fastens the back structure to the corresponding upright rod,
(i) where the one or more boards are attached to the one or more upright rods,
(j) where the sign is placed against the board and the one or more sign fasteners fasten the edges of the sign to the board,
(k) wherein the board is ferromagnetic metallic;
(l) wherein the one or more sign fasteners are magnets.

7. The sign-holder described in claim 6,
(a) wherein the one or more upright rods are telescoping.

8. The sign-holder described in claim 6, the sign-holder further comprising:
(a) one or more cross-rods;
(b) where one or more boards attach to the one or more cross-rods.

* * * * *